Sept. 17, 1963 R. M. WILSON 3,104,076
REEL WINDER
Filed Dec. 1, 1961
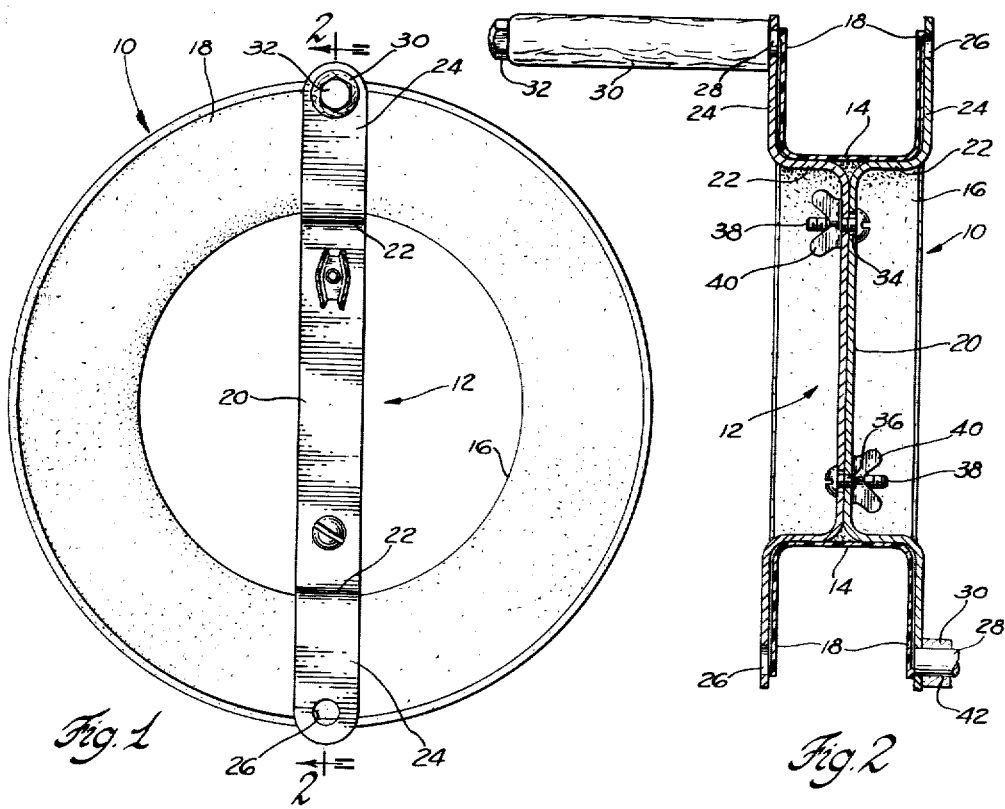
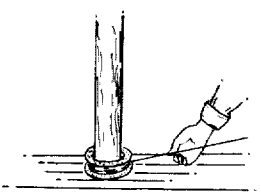
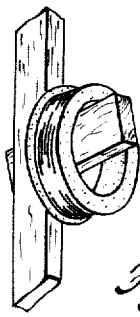
INVENTOR.
Robert M. Wilson
BY Roy A. Plant
ATTORNEY United States Patent Office 3,104,076
Patented Sept. 17, 1963

3,104,076
REEL WINDER
Robert M. Wilson, Battle Creek, Mich., assignor to Dare Products, Incorporated, Battle Creek, Mich., a corporation of Michigan
Filed Dec. 1, 1961, Ser. No. 156,231
8 Claims. (Cl. 242—96)

This invention pertains in general to the art of reels on which and from which a length of material such as wire, cable, rope or the like may be wound and unwound and, more particularly, to a reel with a winder as well as reel winders which may be detachably connected to such a reel to facilitate winding of the length of material thereon.

Prior art reels of the type to which the present invention pertains have typically included a small central reel opening and a rim construction including a rim base and spaced rim flanges on which wire, cable, rope or lengths of other material could be wound and unwound. Reels of this type have been found to present certain handling problems while paying out a length of material therefrom and rewinding the latter on the reel. Thus, in paying out material from the reel, it has been possible in some circumstances to insert a rod through the small reel opening but, in other instances, the reel user has had to juggle the reel in his hands to effect rotation of the reel during the paying out operation. In certain instances, it is desirable if not absolutely necessary to leave the reel untended in a certain place and draw the material therefrom as, for example, when a fence wire stringer attempts to leave the reel in one position on the ground and walks down a line of fence posts along which it is desired to string the wire. In the exemplary situation alluded to above, and as will be appreciated by those acquainted with this art, the reel from which the material is being taken has a tendency to follow the wire stringer down the line of posts, which is not at all satisfactory. In other instances, it would be convenient to pay out material from the reel, as along a line of fence posts, while driving a vehicle, but this operation presents serious problems due to the fact that the vehicle operator's attention to the vehicle is required, thereby distracting him from the handling of the reel. Furthermore, rewinding a length of material on such a reel is a slow and time consuming operation due to the fact that the user of the reel must juggle the latter with its small diameter rim base rotatively during the winding operation. It was a recognition of these and other problems which led to the conception and development of the present invention.

It is, therefore, a principal object and feature of this invention to provide a winder for reels which greatly facilitates use of the latter.

It is yet another object and feature of this invention to provide a reel winder which may be readily attached and detached from a reel whereby the winder can be applied to the reel to either unwind or rewind the latter and easily detached therefrom for use or storage of the reel.

It is another object and feature of this invention to provide, in combination, an improved reel and a reel winder detachably connectable thereto to give more flexibility in use of the reel in unwinding a length of material therefrom, while readily facilitating rewinding of the material thereon.

It is yet another object and feature of this invention to provide, in combination, a reel and reel winder detachably connectable thereto, whereby a single reel winder can service a plurality of reels to permit unwinding of numerous reels in numerous fashions, while using the winder to wind another reel not then in use.

It is yet another and more specific object and feature of this invention to provide a reel winder comprising a pair of brackets each including cooperative rim portions or seats, the brackets being adapted to be detachably connected within the opening in a reel with the aforementioned rim seats in embracing relationship with the rim construction of the reel, and further including handle means which may be manually grasped to rotate the reel and rewind a length of material thereon.

Still further objects and advantages of the present invention will appear as the description proceeds.

To the accomplishment of the foregoing and related ends, the invention, then, consists of the means hereinafter fully described and particularly pointed out in the claims, the annexed drawing and the following description setting forth in detail certain means for carrying out the invention, such disclosed means illustrating, however, but one of various ways in which the principle of the invention may be used.

In the annexed drawing:

FIGURE 1 has a side elevation of a reel and winder connected thereto, and illustrates one preferred embodiment of the invention.

FIGURE 2 is a sectional view taken on line 2—2 of FIGURE 1, looking in the direction of the arrows.

FIGURES 3, 4 and 5 pictorially represent various ways in which the reel may be utilized to pay a length of material therefrom upon detaching the winder from same.

FIGURE 6 is a pictorial representation of one manner of storing the reel with a length of material thereon after removing the winder therefrom.

Referring now to the drawings, and more particularly to FIGURES 1 and 2 thereof, the numeral 10 generally indicates a reel to which the reel winder, generally indicated at 12, may be detachably connected. Although not necessary to practicing the invention, the reel 10 is preferably molded or otherwise formed of a tough and moderately flexible, lightweight, plastic material, and comprises a rim construction including an axially extending annular rim base 14 defining a smooth annular opening 16 extending axially through the reel, and a pair of annular axially spaced rim flanges 18 projecting radially outwardly from opposite ends of the rim base. The inside diameter of the rim base 14, and hence the opening 16, is relatively large compared to prior art reels of this type, and in the preferred embodiment for electric fencing, as shown, is in the nature of six inches as compared with an overall reel diameter of approximately ten inches.

The reel winder 12 comprises a pair of substantially identical rigid integral narrow and elongate brackets each of which includes a main body portion 20, laterally projecting shoulders 22 at each end thereof, and radially outwardly extending side walls 24 projecting from each of the aforementioned shoulders. In the process of forming the substantially identical bracket members, each end of each of the side walls 24 may be provided with an opening indicated at 26, and a rod or spindle 28 is rigidly secured within one opening only of each of the brackets as by threading, riveting together, brazing, or welding so as to project laterally therefrom. If desired, and as shown in the drawings, a suitable manually engageable handle 30 having a bore 42 therethrough may be slipped onto each of the spindles, and the lateral extremities of the latter threaded to receive a suitable retaining nut 32. However, and as will be readily apparent hereinafter, the handles 30 may be dispensed with and the spindles themselves grasped by the person desiring to use the reel winder.

In similar fashion, the main body portion 20 of each bracket may be provided with a smooth opening 34 through one end thereof and a threaded opening 36 through the other end thereof. The arrangement is such, and as will be more fully described hereinafter, as to permit pairing one of the smooth openings 34 in one of the brackets with a threaded opening 36 in the other bracket so as to receive a threaded screw 38 therebetween, the screw being adapted to receive, for locking purposes, a threaded wing nut or the like 40 as illustrated in the drawings.

At this juncture, and referring particularly to FIGURE 2, it will be readily apparent that the brackets are substantially identical, thereby facilitating manufacture of the reel winder and resulting in considerable economies. However, in mating any two of such brackets to assemble the winder, one bracket is turned end for end; in other words, and as will be readily apparent from FIGURE 2, one bracket has been turned end for end in the plane of the drawing relative to the other bracket.

In detachably connecting the reel winder 12 to the reel 10, and after turning two brackets end to end as referred to above, the main body portion 20 of each of these brackets is inserted axially inwardly of the reel opening 16 through the opposite ends of the latter, and the brackets are aligned opposite to each other. As illustrated in FIGURE 2, insertion of each bracket within the reel opening causes the respective shoulders 22 to engage the inner surface of the rim base 14 on the reel, and the bracket side walls 24 to abut and embrace the respective reel rim flanges 18. As will be further apparent, the dimensioning of the reel and the brackets automatically limits inward movement of each of the brackets, and automatically disposes the main body portions 20 of the latter in abutting relationship substantially centrally of the rim base of the reel. The threaded screws 38 may then be inserted, preferably from opposite sides of the reel opening, and threaded first through the smooth opening 34 and then the respective threaded openings 36 in the brackets, and the wing nut 40 or the like threaded thereon to lock the assembly together. Actually, except for locking purposes, the wing nuts can be eliminated since the threaded engagement of the screws 38 with the threaded openings 36 of the respective brackets will hold the assembly in the relationship shown in FIGURES 1 and 2 of the drawing. On the other hand, and as will be readily apparent, the threaded openings 36 in the respective brackets can be eliminated, and the wing nut 40 relied upon alone to hold the assembly in operative relationship.

With the reel winder in position as illustrated in FIGURES 1 and 2, it will now be readily apparent that the spindles 28, if used alone, or the rotatably mounted handles 30, when mounted on said spindles, may be grasped in the opposite hands of a user of the reel, and the reel rotated about the axis of its opening 16 to either pay out a length of material therefrom or, more particularly, rewind it thereon. Furthermore, the reel winder may be readily detached from the reel merely by disengaging the fastening means constituted by the threaded screws 38 and wing nuts 40, thereby permitting the brackets to be removed axially outwardly of the reel opening. At this time, the reel can be used and stored in several different fashions.

For example in view of the large diameter smooth opening of the reel, the latter may be slipped over the arm of a wire stringer as illustrated in FIGURE 3, who can merely stand stationary while a helper winds the material therefrom, or can walk along to pay out the material. FIGURE 4 is similar to FIGURE 3, but illustrates the reel placed on the arm of a tractor operator or the like driving down a row of fence posts, or the like, to pay out a length of material from the reel. FIGURE 5 illustrates the manner in which the reel may be slipped over the top of a fence post so as to retain the reel in place while a wire stringer walks along a row of posts placing the wire ready to hang thereon. Finally, FIGURE 6 illustrates one manner in which the reels can be stored; that is, again due to its large diameter opening the reel may be hung on a 2" x 4" or the like nailed to an upstanding stud.

While but one form of the invention has been shown and described, other forms within the spirit and scope of the invention will now be apparent to those skilled in the art. Therefore, the embodiment shown in the drawing is to be considered as merely set forth for illustrative purposes, and is not intended to limit the scope of the invention herein described and shown.

Other modes of applying the principle of my invention may be employed instead of the one explained, change being made as regards the article and combination herein disclosed, provided the means stated by any of the following claims or the equivalent of such stated means be employed.

I therefore particularly point out and distinctly claim as my invention:

1. A reel winder comprising a pair of brackets in the form of narrow, elongate straps each of which includes a main body portion, a reel rim holding portion having a seat projecting laterally from each end of the main body portion of each of said brackets, detachable means extending between and connecting the main body portions of said brackets for detachably engaging said seats with the rim of a reel on opposite sides of the latter, and manually engageable handle means mounted on each of said brackets in spaced relation to each other.

2. A reel winder comprising a pair of brackets in the form of narrow, elongate straps each of which includes a main body portion, a shoulder projecting laterally from each end of the main body portion of each of said brackets, a side wall projecting radially outwardly from each of said shoulders, detachable means extending between and connecting the main body portions of said brackets for detachably engaging the latter on opposite sides of a reel having a rim, with said shoulder and side wall at each end of each bracket engaging the rim of said reel, and manually engageable handle means mounted on each of said brackets in spaced relation to each other.

3. The invention defined by claim 2, in which said brackets are detachably engageable with a reel in substantial alignment with each other, and one of said handle means is mounted on said side wall at one end of one of said brackets and another of said handle means is mounted on said side wall at the furthermost end of the other of said brackets.

4. A reel winder adapted to be detachably mounted on a reel having a rim of the type including an axially extending rim base defining a reel opening and a pair of axially spaced rim flanges secured to opposite ends of said rim base and projecting radially outwardly therefrom; said winder comprising a pair of brackets in the form of narrow, elongate straps each of which includes a main body portion, a reel rim holding portion with a rim seat at each end of said main body portion of each of said brackets, the main body portion of each of said brackets being removably insertable within a reel opening from opposite sides of the latter to engage said rim seats with the rim base and rim flanges of the reel, detachable means extending between and connecting the main body portions of said brackets for detachably mounting the latter on a reel, and manually engageable handle means mounted on each of said brackets in remote spaced relation to each other.

5. A reel winder adapted to be detachably mounted on a reel having a rim of the type including an axially extending rim base defining a reel opening and a pair of axially spaced rim flanges secured to opposite ends of said rim base and projecting radially outwardly therefrom; said winder comprising a pair of brackets in the form of narrow, elongate straps each of which includes a main body portion, a shoulder projecting laterally from each end of said main body portion of each of said brackets, a side wall projecting radially outwardly from each of said shoulders, the main body portion of each of said brackets being removably insertable within a reel opening from opposite sides of the latter to engage said shoulders with the rim base of the reel and said side walls with the rim flanges of the reel, detachable means extending between and connecting the main body portions of said brackets for detachably mounting the latter on a reel, and manually engageable handle means mounted on the side walls at one end of one of said brackets and on the side wall at the furthermost end of the other other of other brackets.

6. In combination, a reel comprising a rim including an axially extending rim base defining a reel opening, a pair of axially spaced rim flanges secured to said rim base and projecting radially outwardly therefrom; a reel winder adapted to be connected to said reel to rotate the latter about the axis of its opening to wind and unwind a length of material thereon, said winder comprising a pair of brackets in the form of narrow, elongate straps each of which includes a main body portion, a reel rim holding portion with a rim seat at each end of said main body portion of each of said brackets, the main body portion of each of said brackets being insertable within the opening in said reel from opposite sides of the latter to engage said rim seats with said rim base and said rim flanges, means extending between and connecting the main body portions of the brackets for mounting the latter on said reel, and manually engagable handle means mounted on each of said brackets in remote spaced relation to each other.

7. The invention defined to claim 6 in which each of said reel rim seats includes a shoulder projecting laterally from each end of said main body portion of each of said brackets and a side wall projecting radially outwardly from the outer end of each of said shoulders, said shoulders being engageable with said rim base and said side walls being engageable with said rim flanges upon insertion of the main body portion of each of said brackets within the opening in said reel.

8. The invention defined in claim 6 in which releasable means join said body portions so that said reel winder is detachably connected to said reel, each of said reel rim seats includes a shoulder projecting laterally from each end of said main body portion of each of said brackets and a side wall projecting radially outwardly from the outer end of each of said shoulders, said shoulders being engageable with said rim base and said side walls being engageable with said rim flanges upon insertion of the main body portion of each of said brackets within the opening in said reel, and said handle means includes a spindle rigidly secured to and extending outwardly from the side wall at one end of one of said brackets and a spindle rigidly secured to and extending outwardly from the side wall at the furthermost end of the other of said brackets, said spindles being substantially parallel to each other, and manually engageable means rotatably supported on each of said spindles.

References Cited in the file of this patent
UNITED STATES PATENTS

| | | |
|---|---|---|
| 514,104 | Wickey | Feb. 6, 1894 |
| 1,017,532 | Glenn | Feb. 13, 1912 |
| 1,479,106 | Moss | Jan. 21, 1924 |
| 1,956,806 | Mitzen et al. | May 1, 1934 |
| 2,553,097 | Lampe | May 15, 1951 |
| 2,712,908 | Kozminski | July 12, 1955 |
| 3,006,574 | Hardy | Oct. 31, 1961 |

UNITED STATES PATENT OFFICE
CERTIFICATE OF CORRECTION

Patent No. 3,104,076 September 17, 1963

Robert M. Wilson

It is hereby certified that error appears in the above numbered patent requiring correction and that the said Letters Patent should read as corrected below.

Column 5, line 7, for "other other of other" read -- other of said --; line 24, for "the" first occurrence, read -- said --; line 27, for "to" read -- in --.

Signed and sealed this 21st day of April 1964.

(SEAL)
Attest:
ERNEST W. SWIDER

EDWARD J. BRENNER

Attesting Officer

Commissioner of Patents